United States Patent [19]

Scott et al.

[11] 4,142,212

[45] Feb. 27, 1979

[54] TWO-DIMENSIONAL SURFACE ACOUSTIC WAVE IMAGE SCANNING

[75] Inventors: Marion L. Scott, Ridgecrest; Kenneth M. Lakin, Palos Verdes, both of Calif.

[73] Assignee: The United States of America as represented by the Secretary of the Navy, Washington, D.C.

[21] Appl. No.: 822,126

[22] Filed: Aug. 5, 1977

[51] Int. Cl.² .............................................. H04N 3/14
[52] U.S. Cl. ...................................... 358/213; 358/201
[58] Field of Search ................................ 358/201, 213

[56] References Cited

U.S. PATENT DOCUMENTS

| | | | |
|---|---|---|---|
| 3,617,931 | 11/1971 | Pinnow | 331/94.5 |
| 3,633,996 | 1/1972 | Lean | 350/161 |
| 3,826,865 | 6/1974 | Quate et al. | 358/213 |
| 3,826,866 | 7/1974 | Quate et al. | 358/213 |
| 3,836,712 | 9/1974 | Kornreich et al. | 358/209 |
| 3,935,564 | 1/1976 | Quate et al. | 340/173 |
| 3,944,732 | 3/1976 | Kino | 358/93 |
| 4,069,507 | 1/1978 | Defranould et al. | 358/213 |

OTHER PUBLICATIONS

"IBM Technical Disclosure Bulletin", *Two-Dimensional Optical Scanner,* 1976, vol. 19, No. 5, pp. 1951–1952.

*Primary Examiner*—Richard Murray
*Attorney, Agent, or Firm*—R. S. Sciascia; W. Thom Skeer

[57] ABSTRACT

An output electrode which is angularly oriented with respect to the reading and scanning electrode is used with associated circuitry to provide a two dimensional image scan for an acousto-optical cell. The output electrode is an interdigitally shaped echelon and intercepts the output signal at a position which is determined by the transit time to a selected step of the echelon.

19 Claims, 5 Drawing Figures

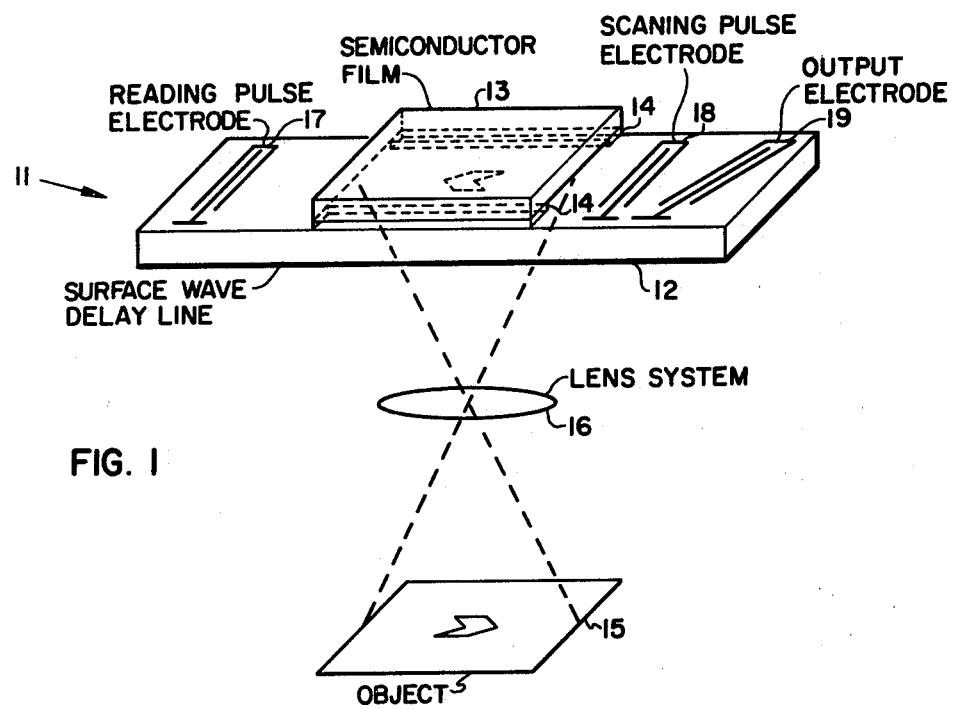
FIG. 1
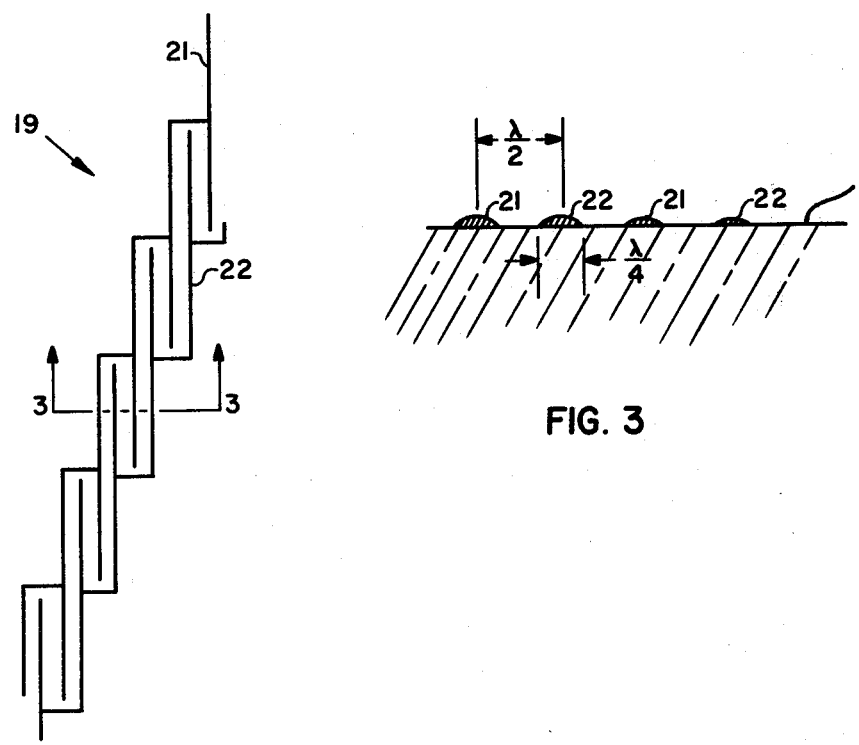
FIG. 2
FIG. 3

TWO-DIMENSIONAL SURFACE ACOUSTIC WAVE IMAGE SCANNING

BACKGROUND OF THE INVENTION

1. Field of the Invention

This invention relates to the field of solid state physics. More particularly, this invention relates to surface acoustic wave devices. In still greater particularity, this invention pertains to a system producing interaction between an optically generated field of charge carriers between a semiconductor and the piezoelectric field in a surface acoustic wave host material in close proximity to the semiconductor. By way of further characterization, the invention relates to an arrangement whereby a two dimensional image scan of an optical image may be made by a surface acoustic wave device.

DESCRIPTION OF THE PRIOR ART

It is well known that the disturbance of the propagation of surface acoustic waves by a proximate charge field may be used for a variety of useful devices. For example, filters for electrical signals and delay lines were early applications which were successfully implemented. The use of optically excited semiconductors to create the charge field resulted in the early development of optical scanning cells. The early cells, as described in Scientific American; Vol. 227, No. 4; Oct. 1972, in an article titled "Acoustic Surface Waves" by Mr. G. S. Kino and Mr. H. J. Shaw, were only single dimension or line scan. Subsequent cells, as described in U.S. Pat. No. 3,826,866 issued on 30 July 1974 to Calvin F. Quate, et al. for "Method and System for Acousto-Electric Scanning" have relied on a plurality of electrode arrangements or a frequency selective system to obtain two dimensional scans.

While such prior devices have been successful for their intended purposes, the requirement for delicate chip connection techniques or accurate frequency determination has precluded the use of such devices in applications where the required number of units dictates a low unit cost.

SUMMARY OF THE INVENTION

This invention achieves a two dimensional scan of an optical image using a surface acoustic wave, SAW, device by an electrode arrangement which separates line scans by virtue of transit time differences for specific scan lines to reach an especially shaped electrode. This electrode is an interdigital electrode having an echelon configuration to intercept the SAWs in discrete areas. The electrode cooperates with low-cost, highly accurate digital circuitry to produce the primary object of the invention, a two dimensional scanning of an optical image.

BRIEF DESCRIPTION OF THE DRAWINGS

FIG. 1 is a perspective view of a simplified form of the transducer of the invention;

FIG. 2 is an enlarged view of the output electrode according to the invention;

FIG. 3 is a sectional view taken along line 3—3 of FIG. 2;

DESCRIPTION OF THE PREFERRED EMBODIMENTS

Figure 4:
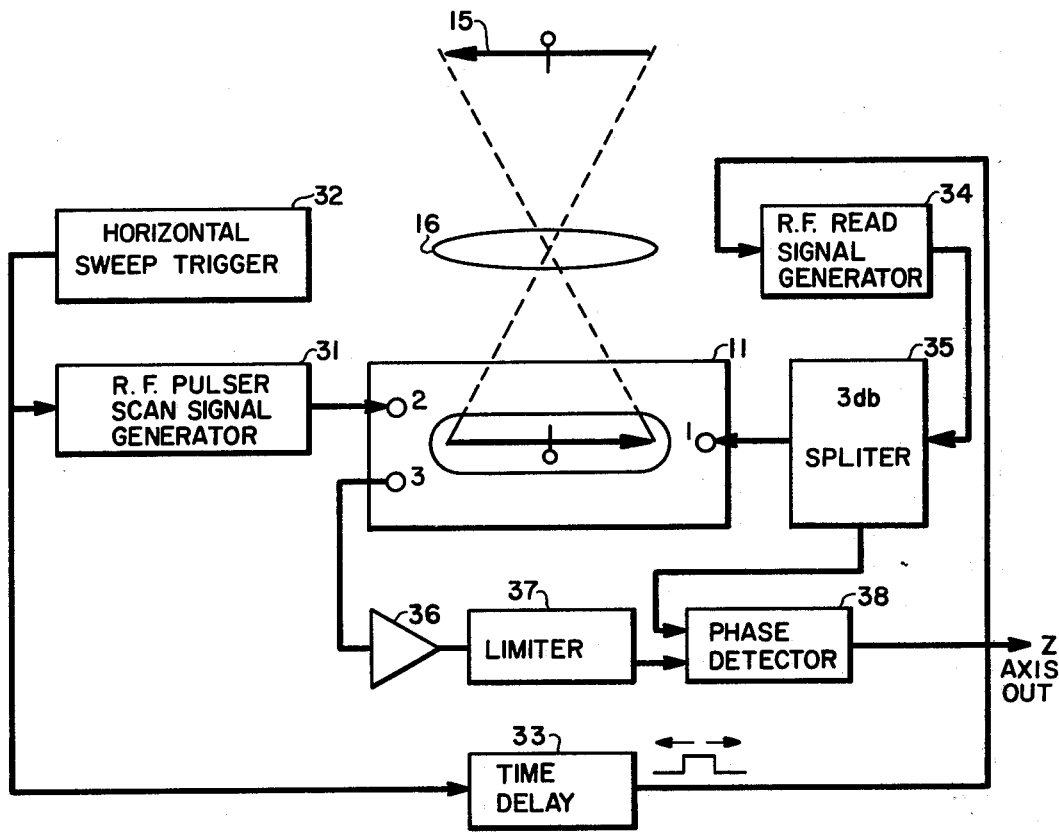
FIG. 4 is a block diagram of the invention.

Referring to FIG. 1, a simplified perspective view of the transducer of the invention is illustrated generally at 11. As shown, a surface wave delay line made of a suitable piezoelectric material is illustrated at 12. A semiconductor film 13 is spaced from one surface of surface wave delay line 12 by means of spacers 14. This spacing provided by spacers 14 is, of course, exaggerated in FIG. 1 for purposes of illustration. However, spacings of one thousand angstroms have proven to be satisfactory to protect semiconductor film 13 from piezoelectric stresses caused by acoustic-wave transmission within surface wave delay line 12 while still providing electric field interaction between the surface wave and the charge regions of semiconductor film 13.

Acoustic-wave delay line 12 may be made of any suitable piezoelectric material such as lithium niobate which is Y-cut Z-propagating, as is conventional in the surface acoustic-wave arts. Semiconductor film 13 may be made of silicon or other semiconductor material which is known to have the required photosensitive characteristics by conventional fabrication techniques. In the development models, 15 ohms per centimeter, N-type silicon has proven satisfactory. The material from which spacers 14 are made is non-critical in the operation of the device, however, practical transducer fabrication techniques have used magnesium fluoride depositions to provide the insulating spacers.

In the operational interaction between the transducer and the operative environment, an object 15 is imaged by a suitable imaging system, such as lens 16, onto semiconductor film 13. In the illustrative arrangement, this imaging is done via surface wave delay line 12 which, of course, requires that delay line 12 be transparent to the radiation used in forming the image of object 15. As will be readily understood by those familiar with the electro-optics arts, the image of object 15 on semiconductor film 13 produces an alteration of the surface such that a plurality of charge states exist which correspond to the image produced by imaging system 16. Imaging system 16 may be any optical system producing a real image rather than the symbolic single lens shown.

A reading pulse electrode 17 and a scanning pulse electrode 18 are deposited on the surface of surface wave delay line 12 in a conventional fashion such that, by suitable excitation, surface waves may be produced to propagate the length of surface wave delay line 12. The purpose of the scanning pulse is two-fold. Long lived surface states are charged by electrons brought to the surface on each positive half cycle of the SAW electric field. This charging of the surface states causes a depletion layer at the surface of the semiconductor. During the time interval between one scanning pulse and the next, the surface states are discharged by holes migrating to the surface after photons create electron-hole pairs near the surface of the silicon. This depletion depth at the semiconductor surface is therefore modulated by the image intensity spatial variations.

A second purpose of the scanning pulse is to cause the differential in propagation velocity that exist due to the depletion depth variation to be converted into frequency shifts of the SAW. As this is accomplished by the scanning pulse because it rapidly recharges the surface state at the same time that a portion of the SAW, propagating in the opposite direction, is passed beneath the same surface states.

Reading pulse electrode 17 produces the reading pulse which travels in a direction opposite from the scanning pulse and has the phase thereof altered by these charged areas in the semiconductor film 13. Since the electric field of the reading pulse extends outward from the surface of the surface wave delay line 12 for approximately one wave-length, it interacts with the charged areas on semiconductor film 13 such that it experiences a phase and amplitude alteration.

At low light levels, the charging and discharging of the surface states, described above, is clearly the dominant mechanism responsible for the observed phase shift. However, when the light level is sufficiently high to completely discharge the surface state, the changes in the surface conductivity of film 13 are believed to be responsible for further observed phase shift effects. However, the successful construction and utilization of the invention does not require the exact nature of the operative mechanism to be understood. If a more rigorus explanation of the operation is desired, reference should be made to the standard texts in this field.

The reading pulse generated by reading pulse electrode 17 is monitored by an output electrode 19. In prior art configuration, the output electrode structure has been parallel to the scanning and reading pulse electrodes. However, as noted above, such arrangements are unsatisfactory for two dimensional image scans. In the instant invention, optical electrode 19 is arranged on the surface of surface wave delay line 12 at an angle extending transversely thereacross such that it is skew with respect to the axis of reading pulse electrode 17 and scanning pulse electrode 18. This nonparallel arrangement permits the use of conventional digital delay type circuitry to produce a two dimensional scan as will be described.

Referring to FIG. 2, the arrangement of electrode 19 is shown in greater detail. As illustrated, electrode 19 employs conventional interdigital arrangement to position the electrode pairs in cooperative relation to one another but, unlike electrodes used heretofore, electrode 19 is arranged in an echelon pattern where the two conductors 21 and 22 form a phased step arrangement to provide a two conductor connection to a plurality of laterally displaced scan areas. Current microcircuit fabrication techniques permit scanning electrodes to be of exceedingly small dimensions such that satisfactory image resolution may be obtained.

Referring to FIG. 3, the spacing and dimensions of the individual electrode are illustrated. This sectional view taken along lines 3—3 of FIG. 2 show that the individual electrode conductors are dimensioned to be a quarter wave length wide and spaced a half wave length apart from center-to-center. Such an arrangement provides the well understood phasing required to assure correct propagational directivity of the surface acoustic wave.

Referring to FIG. 4, transducer 11 is shown with accompanying circuit components. Imaging system 16 is again symbolically illustrated by a single lens forming a real image of object 15 on transducer 11. As shown, an RF pulser 21 is connected to terminal 2, connected to the scan pulse electrode, to provide the scanning pulses, previously described. RF pulser 31 is triggered by a horizontal sweep trigger circuit 32 which is also connected to a suitable time delay 33. Time delay 33 is a conventional digital sequential delay which is configured to delay the pulse from sweep trigger 32 by a fixed increment for each successive pulse. The output of time delay 33 is connected to an RF read pulse signal generator 34 to produce the read pulses previously described. The output of RF read signal generator 34 is connected to terminal 1 of transistor 11 via a three decibel signal splitter 35 to provide the necessary read impulses. The output from the output electrode 19 is connected to terminal 3 of the transducer 11 and is fed to a suitable amplifier 36 which increases the signal amplitude to a predetermined level which will permit signal processing. A limiter 37 removes amplitude variations and transfers the signal, in turn, to a conventional phase detector 38, which also receives a reference input from the 3 decibel splitter 35. The output of phase detector 38 is coupled to the Z axis of a display device to provide the necessary signal translation. If desired, other conventional displays and recorders may be used.

Figure 5:
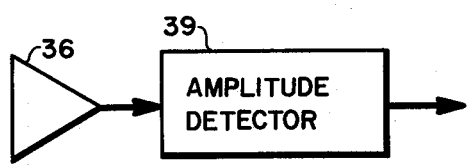
FIG. 5 is an alternative detector arrangement which may be employed for that shown in FIG. 4.

If desired, circuit simplification may be effected by using an amplitude detector 39 in place of the phase detector 38, limiter 37 and splitter 35, as illustrated in FIG. 5. However, the arrangement of FIG. 4 is preferable and avoids any problems introduced by amplitude differences occasioned by different scan path lengths.

The foregoing circuitry description employs conventional electronic circuits which are available as prepackaged microcircuits and the fabrication technique follows standard microcircuit fabrication practice. Although a variety of frequencies may be used to produce desired scan, in laboratory models 240 megahertz was the chosen frequency of the scan and read pulses. Since each pulse scans a single line, the total scan time for the image of two dimensional surface is the sum of the time for one scan multiplied by the total number of scan lines. Thus, a vertical scan repetition rate for 525 lines is 7.85 milliseconds compared to the 33 milliseconds requirement of current 30 cycle TV raster presentation. Thus, it may be seen that the system may be compatible with present image transmission and viewing systems and, in cooperation with such systems, has produced satisfactory results.

Thus, the foregoing description taken together with the appended claims is seen to constitute a disclosure such as to enable a person skilled in the electroacoustics and microcircuit arts having the benefit of the teachings contained therein to make and use the invention. Further, the invention described herein meets the aforestated object of invention, and generally constitutes a meritorious advance in the arts unobvious to such a worker not having the benefit of these teachings.

What is claimed is:

1. A method of electro-optical scanning comprising:
    illuminating a layer of photosensitive material with a two-dimensional optical image in a predetermined image area;
    applying a first short-duration, electrical pulse to a first end of a layer of piezoelectric placed in close proximity to said photosensitive material whereby a surface acoustic wave scanning pulse is caused to traverse the area adjacent said image area in a first dimension;
    applying a second electrical pulse of the same relative duration as said first short-duration electrical pulse to a second end opposite said first end of the layer of piezoelectric material whereby a surface acoustic wave reading pulse is caused to traverse the area adjacent said image area in the same dimension but in an opposite direction of said surface acoustic wave scanning pulse;

intercepting said surface acoustic wave reading pulse at a point which represents a line scan across said image; and repeating the foregoing three steps at different intercepting points spaced at different path lengths and extending across the piezoelectric layer in a dimension transverse to the dimension of propagation of said scanning and reading surface acoustic wave pulses, whereby a line-by-line scan of the two dimensional optical image is obtained.

2. A method of electro-optical scanning according to claim 1 wherein the step of illuminating employs a focused optical image.

3. A method of electro-optical scanning according to claim 1 wherein the locus of the points of interception is a line extending across the piezoelectric layer at an angle with respect to the transverse dimension.

4. A method of electro-optical scanning according to claim 3 wherein said transverse dimension extends at right angles to the dimension of scanning and reading surface acoustic wave propagation.

5. A method of electro-optical scanning according to claim 1 further including the step of phase demodulating the intercepted signal.

6. A method of electro-optical scanning according to claim 1 further including the step of amplitude demodulating the intercepted signal.

7. An improved electro-optical cell comprising:
a semiconductor stratum which is photo sensitive having an image receiving area thereon;
a piezoelectric stratum fixedly positioned adjacent said semiconductor stratum at a distance permitting charge interaction therebetween within the image receiving area;
a first electrode structure positioned in cooperative relationship with said piezoelectric stratum so as to apply an electrical pulse thereto for generating a first surface acoustic wave to traverse said piezoelectric stratum adjacent said image receiving area of said semiconductor stratum;
a second electrode structure positioned in cooperative relationship with said piezoelectric stratum so as to apply an electrical pulse thereto for generating a second surface acoustic wave to transverse said piezoelectric stratum adjacent said image receiving area of said semiconductor stratum in a transit path having a direction opposite that traveled by the surface acoustic wave produced by said first electrode; and
electrical contact means effectively connected to said piezoelectric stratum for responding to the interception of the second surface acoustic waves and positioned with respect to said first and second electrode structures to establish a position dependent transit time which is a function of the position of the transit path of the surface acoustic wave on the piezoelectric stratum with respect to a dimension transverse to the direction of the transit path.

8. An improved electro-optical cell according to claim 7 wherein said semiconductor and piezoelectric strata are separated by a space.

9. An improved electro-optical cell according to claim 7 wherein said first and second electrode structures are interdigitally fingered electrode pairs.

10. An improved electro-optical cell according to claim 9 wherein said first and second electrode structures are mutually parallel to and extend across said piezoelectric stratum.

11. An improved electro-optical cell according to claim 10 wherein the aforesaid electrical contact means intercepts the surface wave along a line angularly disposed with respect to said parallel first and second electrode structures.

12. An improved electro-optical cell according to claim 11 wherein said electrical contact means is an interdigitally fingered electrode pair arranged in an echelon.

13. A two dimensional electronic scanner system comprising:
an optical image forming means for producing an image of a distant object in an image plane;
photo sensitive electrical charge storage means positioned in said image plane for producing an electrical charge analog of said image;
electro-acoustic surface wave transmission means operatively positioned adjacent said photosensitive electrical charge storage means for electrical coupling of signals therebetween;
a pair of electrodes on said electro-acoustic surface wave transmission means to provide electrical signal transfer thereto;
radio frequency scan pulse generator means electrically connected to one of said electrodes for inducing a scan surface acoustic wave in said electro-acoustic surface wave transmission means to traverse the region adjacent said photosensitive charge storage means in a first direction;
radio frequency read pulse generator means electrically connected to a second of said electrodes for inducing a read surface acoustic wave in said electro-acoustic surface wave transmission means to traverse the region adjacent said photosensitive charge storage means in an opposite direction from said first direction;
synchronization trigger means effectively electrically connected to said radio frequency scan and read pulse generators for producing a predetermined timed relation therebetween;
a third electrode positioned with respect to said second electrode that the separation therebetween varies in the direction of traversal of the surface wave as a function of the transverse position therealong for timely interception of said read surface acoustic wave; and
detection means connected to said third electrode for providing an electrical scan of the electrical charge analog of said image corresponding to a predetermined path traveled by said read surface acoustic wave corresponding to said predetermined relation.

14. A two dimensional electronic scanner system according to claim 13 in which said pair of electrodes includes two parallel interdigital electrodes positioned on one surface of said electro-acoustic surface wave transmission means to extend transversly thereacross one on either side of said photosensitive electrical charge storage means.

15. A two dimensional electronic scanner system according to claim 13 in which said third electrode includes an interdigital echelon having a finite number of steps providing a like number of predetermined surface acoustic wave traversal paths.

16. A two dimensional electronic scanner system according to claim 15 in which the aforesaid synchronization trigger means is connected to said radio frequency read pulse generator by a time delay which delays the generation of said read pulse by a time interval which is a function of the surface acoustic wave transmission time corresponding to the step displacement of said interdigital echelon.

17. A two dimensional electronic scanner system according to claim 16 in which said time delay cyclically and incrementally increases the delay for successive read pulses a finite number of intervals corresponding to the number of echelon steps.

18. A two dimensional electronic scanner system according to claim 13 in which said detection means is a phase detector.

19. A two dimensional electronic scanner system according to claim 13 in which said detection means is an amplitude detector.

* * * * *